United States Patent [19]

Ricker et al.

[11] Patent Number: 4,997,237

[45] Date of Patent: Mar. 5, 1991

[54] BI-MODAL DC MOTOR CONTROL FOR A MOTOR DRIVEN ANTI-LOCK BRAKE SYSTEM

[75] Inventors: Dennis J. Ricker, Huber Heights; Richard L. Foster, Beavercreek; Jack W. Savage, Centerville, all of Ohio

[73] Assignee: General Motors Corporation, Detroit, Mich.

[21] Appl. No.: 410,781

[22] Filed: Sep. 22, 1989

[51] Int. Cl.$^5$ .................. B60T 8/34; B60T 13/68; H02P 7/00
[52] U.S. Cl. .................................. 303/115; 303/113; 318/292
[58] Field of Search ................. 303/20, 100, 113, 116, 303/115; 318/292, 294

[56] References Cited

U.S. PATENT DOCUMENTS

| | | | |
|---|---|---|---|
| 3,344,331 | 9/1967 | Adler et al. | 318/294 |
| 3,420,580 | 1/1969 | Dymond | 303/116 |
| 4,367,887 | 1/1983 | Takada | 318/292 X |
| 4,490,655 | 12/1984 | Feldman | 318/294 |
| 4,544,870 | 10/1985 | Kearns et al. | 318/DIG. 2 X |
| 4,653,815 | 3/1987 | Agarwat et al. | 303/115 X |
| 4,910,790 | 3/1990 | Kershaw | 318/292 X |

Primary Examiner—Robert P. Olszewski
Assistant Examiner—Alfred Muratori
Attorney, Agent, or Firm—Mark A. Navarre

[57] ABSTRACT

Differential performance characteristics are achieved in a motor-driven anti-lock braking system with a DC motor having a first brush which is employed for both forward and reverse motor rotation, a second brush which is employed in connection with the first brush when forward motor rotation is desired, and a third brush which is employed in connection with the first brush when reverse motor rotation is desired. The second and third brushes are displaced along the circumference of the motor commutator such that the first and second brushes encompass more turns of the rotor winding than the first and third brushes. As a result, more of the winding turns are active in the forward direction, and the motor torque is maximized for developing the required brake pressure. On the other hand, fewer of the winding turns are active in the reverse direction, and the motor speed is maximized to relatively quickly retract the armature within the valve bore to relieve the brake pressure.

5 Claims, 3 Drawing Sheets

BI-MODAL DC MOTOR CONTROL FOR A MOTOR DRIVEN ANTI-LOCK BRAKE SYSTEM

This invention relates to the control of a DC motor in a vehicular anti-lock brake system (ABS), and more particularly to a bi-modal control which selectively maximizes either the speed or torque characteristics of the motor depending on the direction of rotation.

BACKGROUND OF THE INVENTION

An electric motor driven anti-lock braking system of the type to which this invention pertains is generally depicted in FIG. 1. Referring to FIG. 1, the braking system comprises a hydraulic boost unit 100, a wheel brake 102, an electric motor driven hydraulic pressure modulator 104, and an electronic controller 106 for operating the modulator 104 with current from the vehicle storage battery 108. The boost unit 100 develops hydraulic pressure in line 120 in relation to the force applied to an operator manipulated brake pedal, the line 120 being connected to the brake 102 via modulator 104 and brake line 122. Brake 102 is depicted as a disk brake caliper which develops braking force on the wheel rotor 126 in relation to the hydraulic pressure in brake line 122.

The modulator 104 comprises an armature 130 axially displaceable in the modulator bore 132, a check ball 134 resiliently seated on a ball seat 136 disposed between the brake lines 120 and 122, and a bi-directional electric motor 138 coupled to the armature 130 via a reduction gearset 140 and a ball screw actuator 142 to control the axial displacement of armature 130.

Energization of the motor 138 is controlled by the electronic controller 106 in response to a signal on line 144 indicative of the angular velocity of rotor 126. When the controller 106 energizes the motor 138 for rotation in a forward direction, the ball screw actuator 142 extends into the bore 132, thereby extending armature 130 to unseat the check ball 134. This opens the communication between brake lines 120 and 122, and represents the normal or quiescent state of the anti-lock brake system. When the controller 106 energizes the motor 138 for rotation in the opposite or reverse direction, the ball screw actuator 142 retracts armature 130 within the bore 132, permitting spring 146 and the fluid pressure in brake line 120 to seat the check ball 134 on the ball seat 136, thereby isolating the brake line 122 from the brake line 120. In this condition, the brake fluid in line 122 backfills the modulator bore 132, relieving the fluid pressure developed at brake 102.

In anti-lock operation, the brake pressure in line 122 is modulated by repeatedly reversing the direction of rotation of motor 138 to effect a dithering movement of the armature 130 in the bore 132. When an incipient wheel lock condition is detected, the controller 106 causes the motor 138 to rotate in the reverse direction to retract the armature 130; when recovery of the wheel speed is detected, the controller 106 causes the motor 138 to rotate in the forward direction to extend the armature 130 for increasing the brake pressure.

During the anti-lock operation described above, optimum braking performance requires different motor speed/torque characteristics depending on the direction of motor rotation. When the armature 130 is being retracted (reverse direction of rotation), the torque requirement is relatively low, but the speed requirement is relatively high in order to enable quick relief of the brake pressure. When the armature 130 is being extended (forward direction of rotation), the speed requirement is relatively low, but the torque requirement is relatively high in order to develop adequate pressure in brake line 122.

Unfortunately, the speed/torque characteristics of a conventional DC motor are substantially the same in both directions, and some design compromises must be made in order to provide acceptable performance in both the forward and reverse directions of motor rotation. Of course, this involves some sacrifice in the anti-lock braking performance.

SUMMARY OF THE PRESENT INVENTION

The present invention is directed to an improved DC motor control for an anti-lock braking system of the above type in which the motor torque is maximized in the forward direction of rotation to develop adequate brake pressure, while the motor speed is maximized in the reverse direction to enable quick relief of the brake pressure. The result is an anti-lock braking system in which the braking performance is maximized without the design compromise penalties of presently known systems.

According to this invention, the differential motor performance characteristic is achieved with a DC motor having a first brush which is employed for both forward and reverse motor rotation, a second brush which is employed in connection with the first brush when forward motor rotation is desired, and a third brush which is employed in connection with the first brush when reverse motor rotation is desired. The second and third brushes are displaced along the circumference of the motor commutator such that the first and second brushes encompass more turns of the rotor winding than the first and third brushes. As a result, more of the winding turns are active in the forward direction, and the motor torque is maximized for developing the required brake pressure. On the other hand, fewer of the winding turns are active in the reverse direction. In this case, the effective voltage is greater, and the motor speed is maximized to relatively quickly retract the armature 130 within the valve bore 132 to relieve the brake pressure.

DETAILED DESCRIPTION OF THE DRAWINGS

Figure 1:
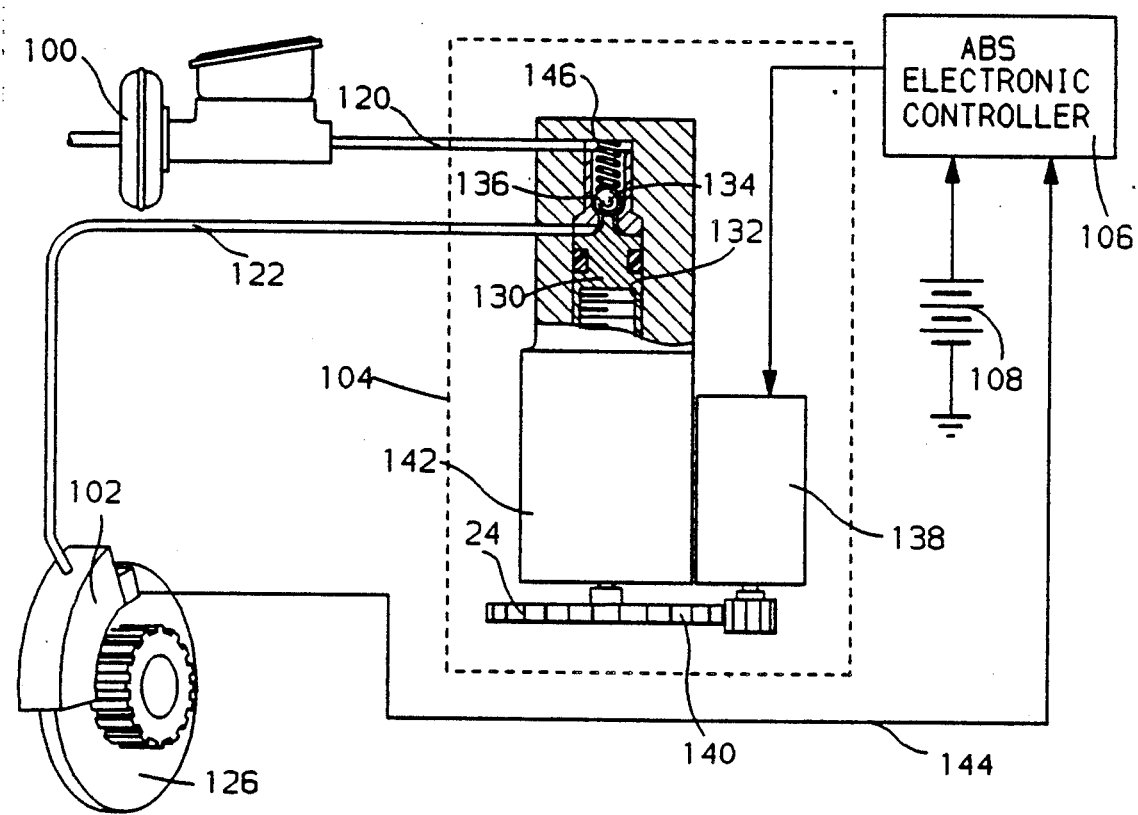
FIG. 1 is a system drawing of a vehicular anti-lock braking system of the type to which the present invention pertains.
Figure 2:
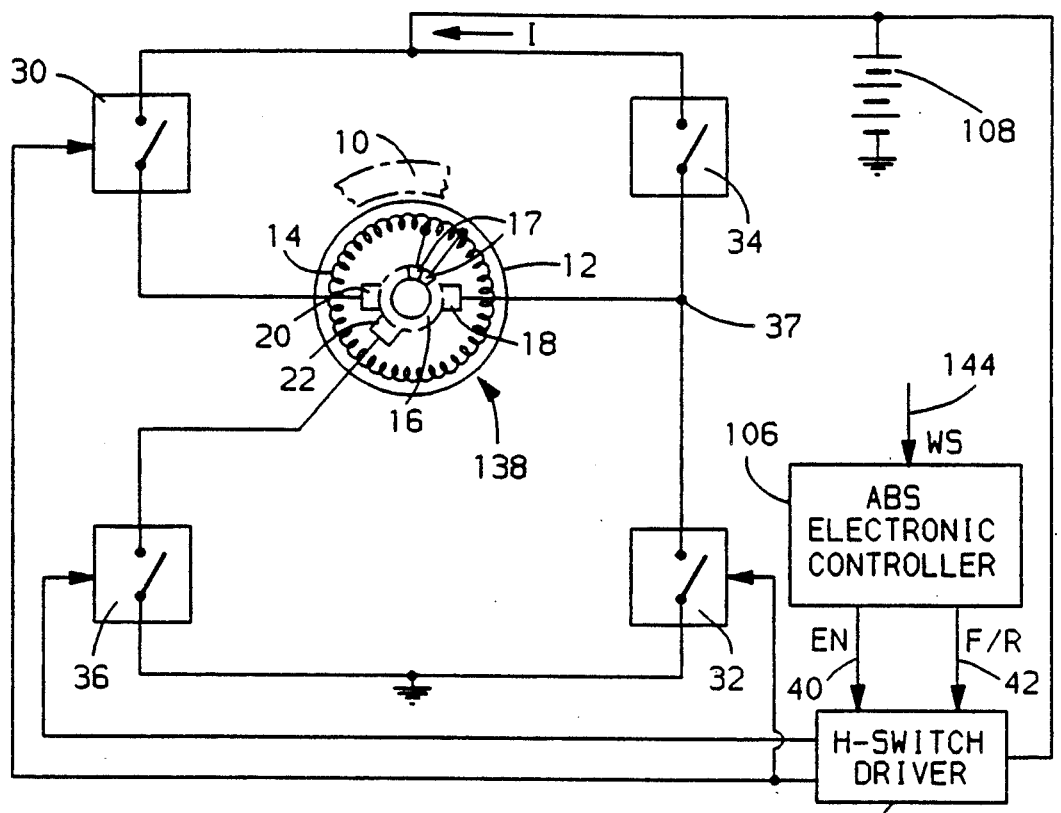
FIGS. 2 and 3 are schematic diagrams of DC motor controls in accordance with first and second embodiments of this invention.

Referring to FIG. 2, the reference numeral 138 generally designates the DC motor of FIG. 1. As with any DC motor, it comprises a permanent magnet or wound field stator 10, a rotor 12 supporting a rotor winding 14, and a commutator 16 mounted for rotation with the rotor 12. The commutator 16 includes a plurality of segments or bars 17 connected to distributed turns of the rotor winding 14, as indicated in FIG. 2. Three brushes 18, 20 and 22 are secured to the stator 10 so as to resiliently engage the outer periphery of commutator 16 for energizing the rotor winding 14 in relation to the rotor position to produce torque for rotating the rotor in the desired direction. The brushes 18 and 20 are oppositely disposed about commutator 16, and are thus separated by a balanced number of rotor winding turns. The brush 22 is displaced along the circumference of the commutator 16 relative to the brush 20 so that the brushes 18 and 22 encompass fewer effective turns of the rotor winding 14 than the brushes 18 and 20. As a result, more of the rotor winding turns are active in the forward direction, and the motor torque is maximized for developing the required brake pressure. On the other hand, fewer of the winding turns are active in the reverse direction. In this case, the effective voltage is greater, and the motor speed is maximized to relatively quickly retract the armature 130 within the valve bore 132 to relieve the brake pressure.

The motor 138 is suitably energized with current from the vehicle storage battery 108 via a bridge or H-switch comprising the electronic switches 30, 32 34 and 36. The switches 30–36, which may be transistors, relays, or other switching devices, are operated by a conventional H-switch driver circuit 38, which in turn, is controlled by the ABS electronic controller 106. The enable (EN) and forward/reverse (F/R) inputs on lines 40 and 42 are generated by the controller 106 in response to vehicle wheel speed information (WS) as described above in reference to FIG. 1.

The bridge switch 30 is connected between the positive terminal of battery 108 and the brush 20; the bridge switch 36 is connected between the negative terminal of battery 108 and the brush 22; the bridge switches 34 and 32 are across the battery 108; and the brush 18 is connected to the junction 37 between the bridge switches 34 and 32.

When it is desired to increase the brake pressure, the ABS electronic controller 106 signals the H-switch driver 38 to close the bridge switches 30 and 32, energizing the rotor winding 14 via brushes 18 and 20. This maximizes the torque characteristic of the motor 138, enabling motor 138 to extend the ball screw actuator 142 for increasing the brake pressure in line 122. When it is desired to relieve the brake pressure, the ABS electronic controller 106 signals the H-switch driver 38 to close the bridge switches 34 and 36, energizing the rotor winding 14 via brushes 18 and 22. This maximizes the speed characteristic of motor 138, enabling motor 138 to quickly retract the ball screw actuator 142 within the bore 132 to decrease the brake pressure in line 122.

The motor control of FIG. 2 requires a somewhat unconventional H-switch in that three wires must extend between the motor 138 and the control electronics. The embodiment depicted in FIG. 3 is similar in function, but requires only two wires between the motor 138 and control electronics; here, the diodes 50 and 52 serve to steer the bridge current to the appropriate brush 20 or 22.

Figure 3:
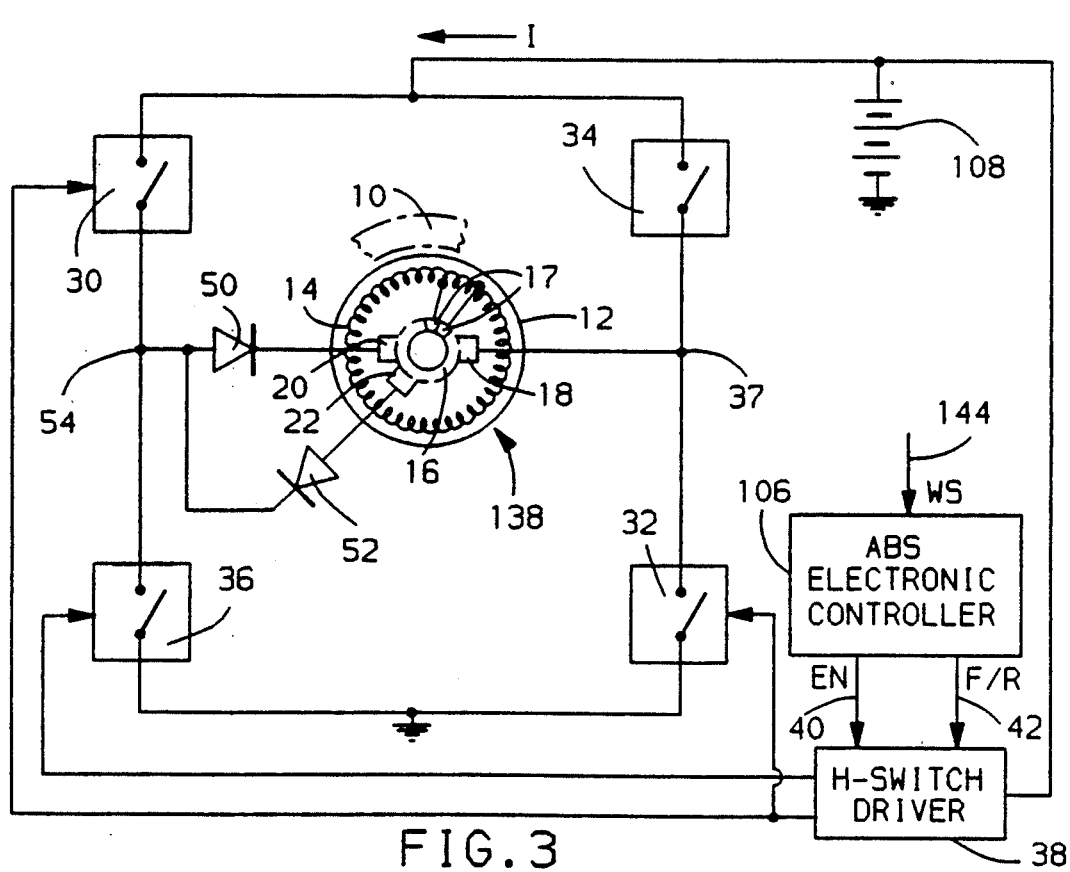

Referring specifically to FIG. 3, the reference numerals of FIGS. 1 and 2 have been repeated where appropriate. Here however, the bridge switches 30 and 36 are connected across the battery 108, and the brushes 20 and 22 are connected to a junction 54 between the bridge switches 30 and 36 via the diodes 50 and 52, respectively. The diodes 50 and 52 are oppositely poled so that when the bridge switches 30 and 32 are closed to achieve forward rotation, the diode 50 conducts and the diode 52 blocks to isolate the brush 22 from battery 108.

When the bridge switches 34 and 36 are closed to achieve reverse rotation, the diode 52 conducts and the diode 50 blocks to isolate the brush 20 from battery 108. In some applications, it may be acceptable to omit diode 50 entirely since the rotor winding portion between brushes 18 and 22 will be the dominant current path.

Figure 4:
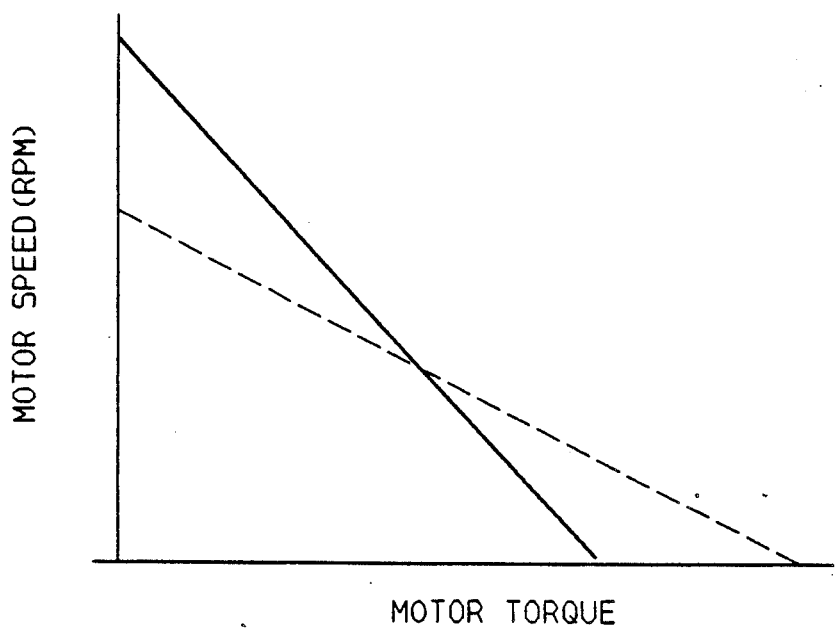
FIGS. 4 and 5 depict the motor speed vs. motor torque and motor current vs. motor torque characteristics, respectively, for the forward and reverse directions of motor rotation.
Figure 5:
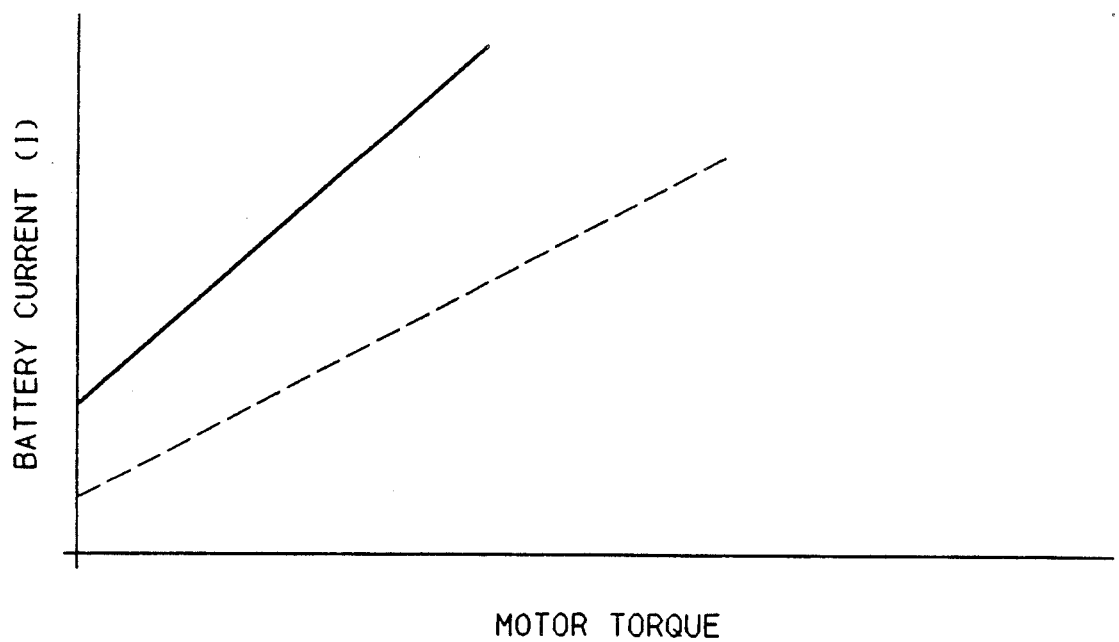

FIGS. 4 and 5 compare the operating characteristics of motor 138 during the forward and reverse directions of motor rotation. FIG. 4 depicts the motor speed as a function of motor output torque, and FIG. 5 depicts the bridge or battery current I as a function of motor output torque. In each case, the forward direction characteristic is designated by the broken trace, and the reverse direction characteristic is designated by the solid trace.

Referring to FIG. 4, it will be seen that the speed of rotation in the reverse direction is significantly greater than in the forward direction for free speed loading. In practice, the speed advantage may be on the order of 1.5:1.

Referring to FIG. 6, it will be seen that the torque per unit current in the forward direction is substantially greater than in the reverse direction. Since, as a practical matter, the motor current is limited in relation to the size of the rotor windings, the torque capability achieved in the forward direction clearly exceeds that achieved in the reverse direction. In practice, the torque advantage may be on the order of 1.5:1.

In the manner described above, the motor control of the present invention provides improved ABS performance without suffering the design compromise penalties of presently known systems. While described in reference to the illustrated embodiment, it will be recognized that various modifications will occur to those skilled in the art, and that systems incorporating such modifications may fall within the scope of this invention which is defined by the appended claims.

The embodiments of the invention in which an exclusive property or privilege is claimed are defined as follows:

1. A vehicle brake pressure modulator including armature means displaceable to develop a regulated fluid brake pressure, and pressure control means including an electric motor drivingly connected to said armature means adapted when driven in forward and reverse directions to effect forward and reverse displacement of said armature for increasing and decreasing said brake pressure, the improvement wherein:

the electric motor includes a rotor winding, a commutator having segments connected to points along the length of said rotor winding, first and second brush elements oppositely disposed about the commutator, and a third brush element angularly displaced from said second brush element; and control means effective (1) when it is desired to increase the brake pressure to energize the rotor winding through said first and second brush elements to achieve substantially maximum motor torque per unit current at a first motor speed in the forward direction for adequately developing the increase in brake pressure, and (2) when it is desired to decrease the brake pressure to energize the rotor winding through said first and third brush elements to achieve substantially maximum motor speed per unit torque in the reverse direction for developing a motor speed greater than said first motor speed to quickly effect the decrease in brake pressure.

2. The improvement set forth in claim 1, wherein:

the control means includes a storage battery having first and second terminals, and a set of four switching devices connecting the storage battery terminals to the rotor winding through the first, second and third brush elements to effect the rotor winding energization.

3. The improvement set forth in claim 2, wherein:

first and second switching devices connect the first terminal of the storage battery to the first and second brush elements, respectively, and third and fourth switching devices connect the second terminal of the storage battery to the third and first brush elements, respectively, forward rotation of the motor being achieved by rendering the second and fourth switching devices conductive, and reverse rotation of the motor being achieved by rendering the first and third switching devices conductive.

4. The improvement set forth in claim 2, wherein the set of switching devices comprises:

first and second serially connected pairs of switching devices connected between the first and second terminals of the storage battery defining first and second bridge terminals between the respective pairs of serially connected switching devices, the first brush element being connected to the first bridge terminal, the second brush element being connected to the second bridge terminal, and the third brush element being connected to the second bridge terminal through a current steering device which isolates the third brush element from the storage battery when the rotor winding is energized to produce motor rotation in the forward direction.

5. The improvement set forth in claim 2, wherein the set of switching devices comprises:

first and second serially connected pairs of switching devices connected between the first and second terminals of the storage battery defining first and second bridge terminals between the respective pairs of serially connected switching devices, the first brush element being connected to the first bridge terminal, the second brush element being connected to the second bridge terminal through a first current steering element which isolates the second brush element from the storage battery when the rotor winding is energized to produce motor rotation in the reverse direction, and the third brush element being connected to the second bridge terminal through a current steering device which isolates the third brush element from the storage battery when the rotor winding is energized to produce motor rotation in the forward direction.

* * * * *